US012669151B2

(12) United States Patent
Gupta et al.

(10) Patent No.: US 12,669,151 B2
(45) Date of Patent: Jun. 30, 2026

(54) WORK VEHICLE WITH FLEXIBLE POWER TAKE-OFF SHIELD

(71) Applicant: CNH Industrial America LLC, New Holland, PA (US)

(72) Inventors: Nikhil Gupta, Hoshiarpur (IN); James Gessel, Geneseo, IL (US)

(73) Assignee: CNH Industrial America LLC, New Holland, PA (US)

( * ) Notice: Subject to any disclaimer, the term of this patent is extended or adjusted under 35 U.S.C. 154(b) by 758 days.

(21) Appl. No.: 18/081,146

(22) Filed: Dec. 14, 2022

(65) Prior Publication Data

US 2024/0196794 A1     Jun. 20, 2024

(51) Int. Cl.
| | |
|---|---|
| *F16D 3/84* | (2006.01) |
| *A01B 71/08* | (2006.01) |
| *A01D 41/14* | (2006.01) |
| *A01D 41/16* | (2006.01) |
| *B60K 25/06* | (2006.01) |

(52) U.S. Cl.
CPC .............. *F16D 3/841* (2013.01); *A01B 71/08* (2013.01); *A01D 41/142* (2013.01); *A01D 41/16* (2013.01); *B60K 25/06* (2013.01); *F16D 3/84* (2013.01); *F16D 3/843* (2013.01); *F16D 3/845* (2013.01)

(58) Field of Classification Search
CPC .......... F16D 3/841; F16D 3/845; F16D 3/843; F16D 3/84; B60K 25/06; A01D 75/20; A01D 69/002; A01D 41/16; A01D 41/142; A01B 71/08; A01B 71/066
See application file for complete search history.

(56) References Cited

U.S. PATENT DOCUMENTS

| | | | | |
|---|---|---|---|---|
| 2,025,635 | A | * 12/1935 | Bishoff | .................... F16J 3/045 |
| | | | | 403/50 |
| 3,053,062 | A | * 9/1962 | Geisthoff | ............... A01B 71/08 |
| | | | | 464/178 |
| 3,504,508 | A | 4/1970 | Bornzin | |
| 3,795,118 | A | * 3/1974 | Kesl | ........................ F16D 3/845 |
| | | | | 464/175 |

(Continued)

FOREIGN PATENT DOCUMENTS

| | | | | |
|---|---|---|---|---|
| CN | 106015372 | A | * 10/2016 | ............. F16D 3/843 |
| DE | 3509127 | A | * 9/1986 | ............. A01B 71/08 |

(Continued)

OTHER PUBLICATIONS

EP Application No. 23216892, EP Search Report dated May 15, 2024, 8 pgs.

*Primary Examiner* — Arpad Fabian-Kovacs
(74) *Attorney, Agent, or Firm* — Selene Haedi

(57)     ABSTRACT

A work vehicle includes: a chassis; a housing carried by the chassis and including a cowl; a power take-off extending through the cowl and configured to connect to a power source; and an attachment movably coupled to the housing and including: at least one driven element coupled to the power take-off; and a shield assembly associated with and covering the power take-off. The shield assembly includes a rigid section defining a first diameter and a flexible section coupled to the rigid section and defining a second diameter that is greater than the first diameter. The flexible section is configured to fit over and maintain overlap with the cowl during tilting of the attachment.

15 Claims, 7 Drawing Sheets

(56)                    References Cited

U.S. PATENT DOCUMENTS

| | | | |
|---|---|---|---|
| 3,797,329 | A | 3/1974 | Quirk |
| 3,866,440 | A | 2/1975 | Stananought |
| 4,157,019 | A | 6/1979 | von Allwörden |
| 4,605,332 | A * | 8/1986 | Mayhew .................... F16D 3/84 |
| | | | 403/50 |
| 5,800,271 | A * | 9/1998 | Herchenbach .......... F16D 3/841 |
| | | | 464/175 |
| 5,895,323 | A * | 4/1999 | Benzi ..................... F16D 3/843 |
| | | | 74/609 |
| 5,964,076 | A * | 10/1999 | Loehr ................. A01B 71/066 |
| | | | 56/DIG. 14 |
| 6,159,104 | A * | 12/2000 | Mikeska ................. F16D 3/841 |
| | | | 464/170 |
| 6,203,440 | B1 * | 3/2001 | Bondioli ................. F16D 3/841 |
| | | | 403/23 |
| 7,775,891 | B2 * | 8/2010 | Yamamoto ............. F16D 3/845 |
| | | | 464/175 |
| 8,287,392 | B2 * | 10/2012 | Harkcom .............. B60K 25/06 |
| | | | 464/172 |
| 9,562,570 | B2 | 2/2017 | Burgess |
| 10,309,464 | B2 * | 6/2019 | Kobayashi ........... F16D 3/2245 |
| 12,146,525 | B2 * | 11/2024 | Bondioli ................ F16D 3/385 |
| 2012/0011948 | A1 | 1/2012 | Harkcom |
| 2023/0043113 | A1 * | 2/2023 | Kobayashi ........... F16D 3/2245 |

FOREIGN PATENT DOCUMENTS

| | | | | | |
|---|---|---|---|---|---|
| DE | 3908497 | A1 * | 10/1989 | ............ | F16D 3/845 |
| DE | 10302694 | A1 * | 7/2004 | ............ | B60K 25/06 |
| DE | 102008033920 | B3 * | 2/2010 | ............ | F16D 3/845 |
| EP | 0086606 | | 8/1983 | | |
| EP | 3088759 | | 11/2016 | | |
| FR | 2550833 | A2 * | 2/1985 | ............ | F16D 3/841 |
| FR | 2579701 | A1 * | 10/1986 | ............ | F16D 3/841 |
| FR | 2 701 802 | B1 | 3/1995 | | |
| GB | 780930 | A | 8/1957 | | |
| JP | 2006275170 | A * | 10/2006 | ............ | F16D 3/223 |
| WO | WO-0116501 | A1 * | 3/2001 | ............... | F16C 3/03 |
| WO | WO-2005077140 | A1 * | 8/2005 | ............ | A01B 71/08 |
| WO | WO-2013152991 | A1 * | 10/2013 | ............ | A01D 75/20 |
| WO | 2021/259856 | A1 | 12/2021 | | |

* cited by examiner

WORK VEHICLE WITH FLEXIBLE POWER TAKE-OFF SHIELD

FIELD OF THE INVENTION

The present invention pertains to work vehicles and, more specifically, to shields for work vehicles.

BACKGROUND OF THE INVENTION

Many work vehicles are known. One type of known work vehicle is an agricultural harvester that is used to harvest crops. An agricultural harvester known as a "combine" is historically termed such because it combines multiple harvesting functions with a single harvesting unit, such as picking, threshing, separating, and cleaning. A combine includes a header which removes the crop, such as corn, from a field, and a feeder housing which transports the crop matter into a threshing rotor. The threshing rotor rotates within a perforated housing, which may be in the form of adjustable concaves, and performs a threshing operation on the crop to remove the grain. Once the grain is threshed it falls through perforations in the concaves onto a grain pan. From the grain pan the grain is cleaned using a cleaning system, and is then transported to a grain tank onboard the combine. A cleaning fan blows air through the sieves to discharge chaff and other debris toward the rear of the combine. Non-grain crop material such as straw from the threshing section proceeds through a residue handling system, which may utilize a straw chopper to process the non-grain material and direct it out the rear of the combine. When the grain tank becomes full, the combine is positioned adjacent a vehicle into which the grain is to be unloaded, such as a semi-trailer, gravity box, straight truck, or the like, and an unloading system on the combine is actuated to transfer the grain into the vehicle.

Many work vehicles, including agricultural harvesters, include driven elements that are powered by a power take-off. The power take-off couples to a power source, such as an engine or transmission, and couples to the driven element directly or via one or more intermediary couplings. Power take-offs thus allow driven elements to be powered by a power source that is remote from the driven element.

Since the power take-off must be in motion to transfer power, the power take-off is generally shielded to prevent injury to users and also limit damage to the power take-off. Some power take-offs may span across multiple elements. For example, a power take-off that powers elements of a header, such as the cutter bar, may extend through the feeder housing. Such power take-offs are difficult to shield because the header may be moveable with respect to the feeder housing.

What is needed in the art is a way to shield a power take-off in areas where the power take-off spans multiple elements.

SUMMARY OF THE INVENTION

Exemplary embodiments provided according to the present disclosure provide a shield assembly with a flexible section that fits over and maintains overlap with a cowl of a housing during tilting of an attachment relative to the housing.

In some exemplary embodiments provided according to the present disclosure, a work vehicle includes: a chassis; a housing carried by the chassis and including a cowl; a power take-off extending through the cowl and configured to connect to a power source; and an attachment movably coupled to the housing and including: at least one driven element coupled to the power take-off; and a shield assembly associated with and covering the power take-off. The shield assembly includes a rigid section defining a first diameter and a flexible section coupled to the rigid section and defining a second diameter that is greater than the first diameter. The flexible section is configured to fit over and maintain overlap with the cowl during tilting of the attachment.

One possible advantage that may be realized by exemplary embodiments provided according to the present disclosure is that the flexible section allows tilting of the attachment relative to the housing while maintaining overlap, which may be necessary to meet safety requirements.

Another possible advantage that may be realized by exemplary embodiments provided according to the present disclosure is that that the flexible section can be easily and conveniently slidable to different positions to access or shield the power take-off.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

Figure 1:
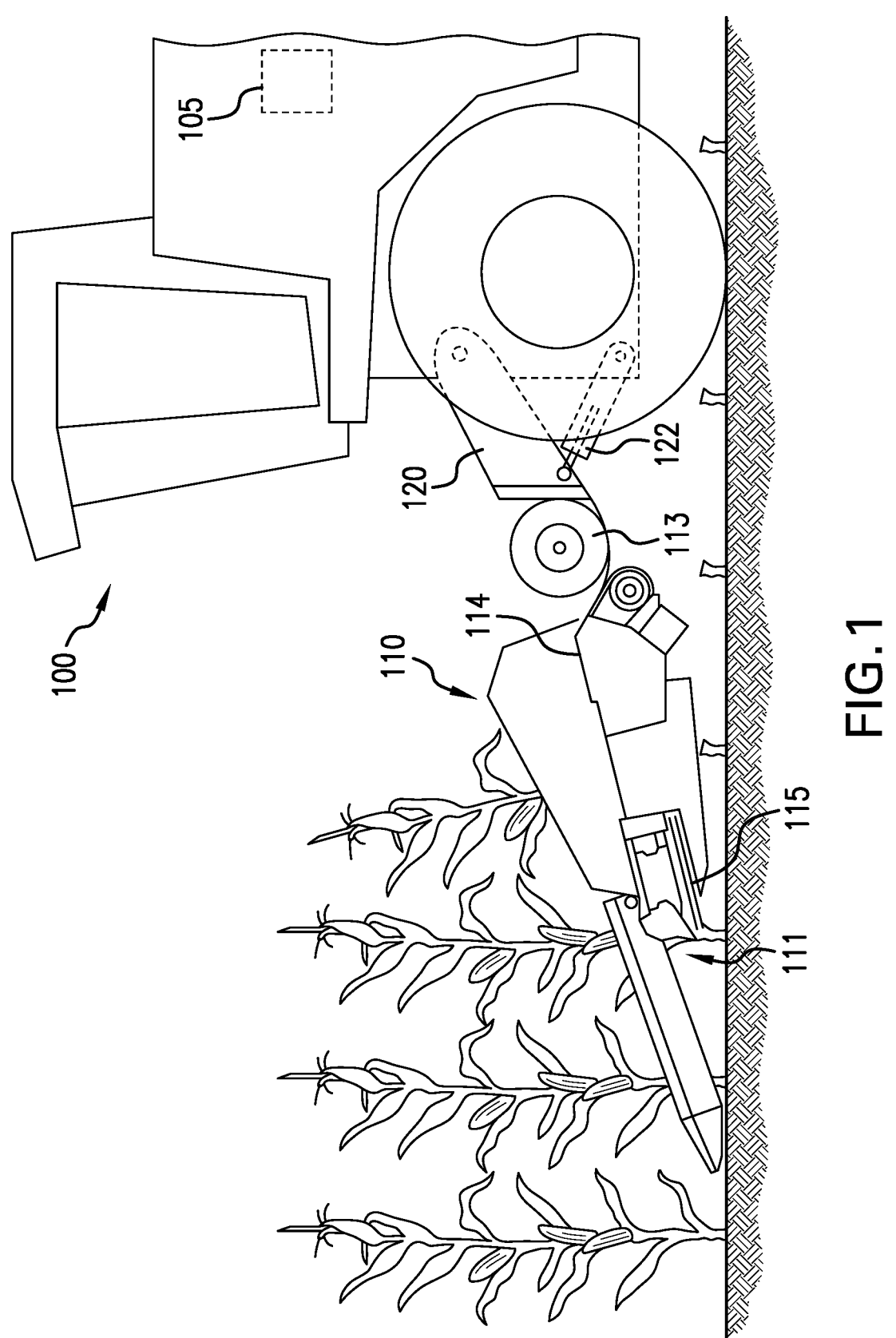
FIG. 1 illustrates a side view of an exemplary embodiment of a work vehicle in the form of an agricultural harvester that is provided in accordance with the present disclosure.

Referring now to FIG. 1, an exemplary embodiment of an agricultural vehicle 100 is illustrated in the form of a combine harvester that includes a power source 105 in the form of an engine, a header 110 that is configured for harvesting corn or other stalked crops. The header 110 is mounted to the vehicle 100 by coupling to a feeder housing 120 and an actuator 122. The header 110 includes a header frame 114 carrying a plurality of row units 111 each including a pair of deck plates and a chopper 115, as is known. Crop material, including corn ears and stalks, collected by the header 110 may then be conveyed to the feeder housing 120 by a screw conveyor 113.

Figure 2:
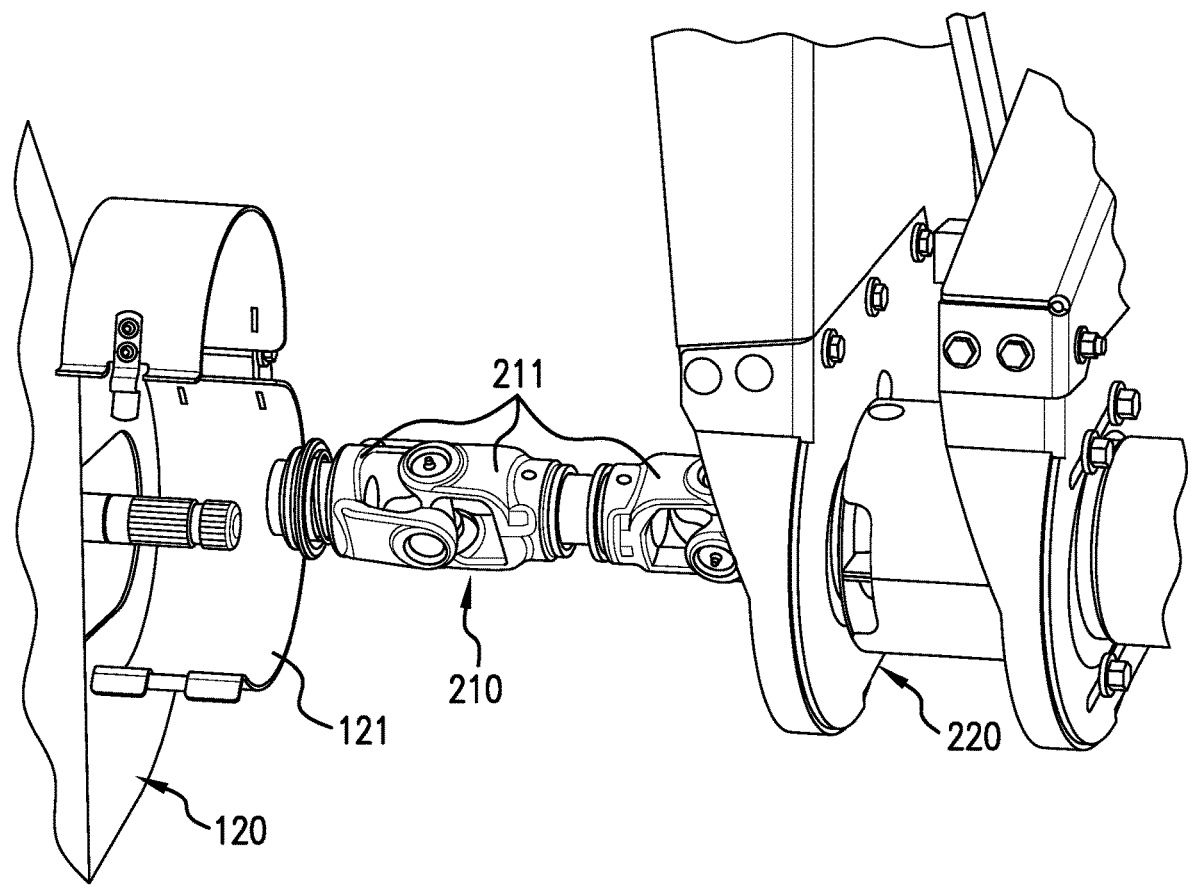
FIG. 2 illustrates an exposed power take-off extending through a housing of the work vehicle of FIG. 1.

Referring now to FIG. 2 as well, an exemplary embodiment of a power take-off 210 is illustrated that extends through a cowl 121 of the feeder housing 120. The power take-off 210 is coupled to the power source 105 (illustrated in FIG. 1) by coupling to a transmission coupled to the power source 105. The power take-off 210 may include, for example, two or more universal joints ("U-joints") 211 that are connected to one another in order to transmit power to a coupled element. While the power take-off 210 is illustrated and described as a series of coupled together U-joints 211, it should be appreciated that the power take-off 210 can include a plurality of other types of joints or, alternatively, include or consist of a drive shaft. As illustrated, the power take-off 210 can couple to a gearbox 220 that is coupled to one or more driven elements of the header 110, such as one of the row units 111 and/or one or more elements of the row units 111 including the chopper 115 and/or a stalk roll, in order to drive the coupled element(s). It should thus be appreciated that the power take-off 210 drives one or more driven elements of the header 110.

In known work vehicles, such as combines, some power take-offs may extend between two elements that move relative to one another. In such situations, it is difficult to cover and shield the power take-off due to the relative movement between the elements. Ultimately, the goal of the shield is to cover the power take-off at all times during operation of the work vehicle. Further, there should be some degree of overlap between the shield and the elements to shield the power take-off when there is relative movement in order to enhance safety. Known shield assemblies do not always provide the desired overlap during relative movement.

Figure 3:
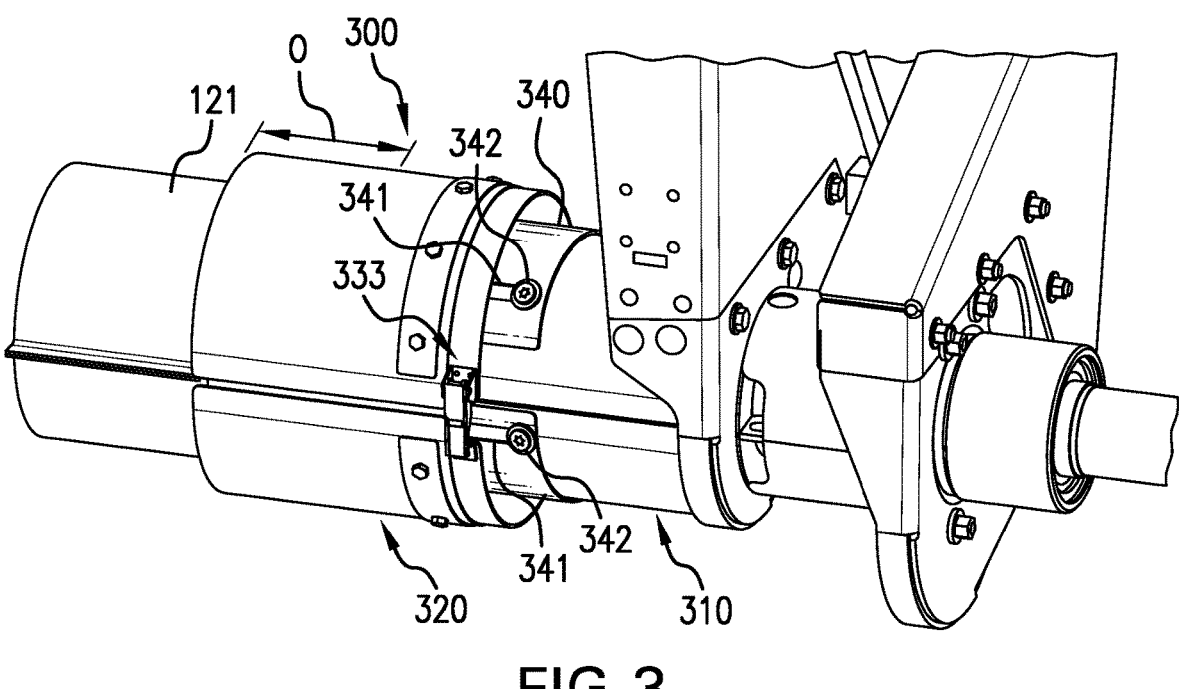
FIG. 3 illustrates an exemplary embodiment of a shield assembly provided according to the present disclosure covering the power take-off of FIG. 2.
Figure 4:
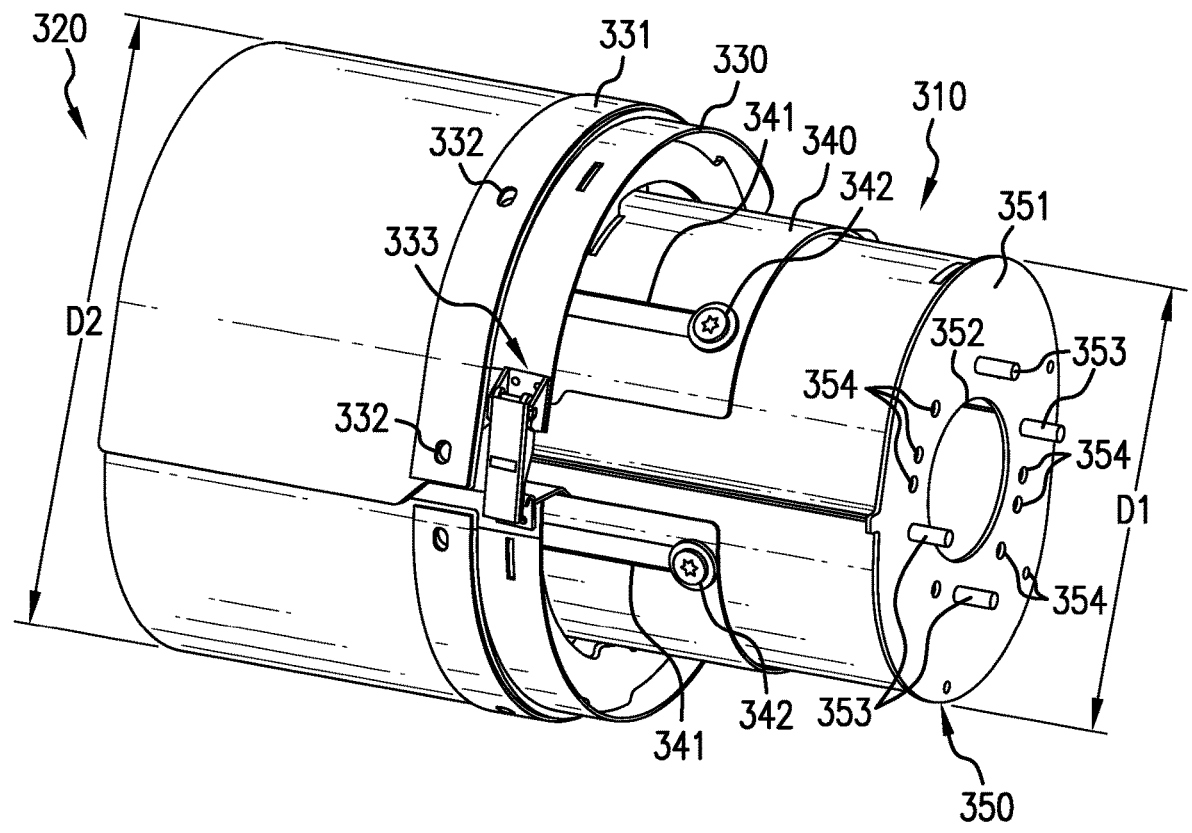
FIG. 4 illustrates a perspective view of the shield assembly of FIG. 3 by itself.
Figure 5:
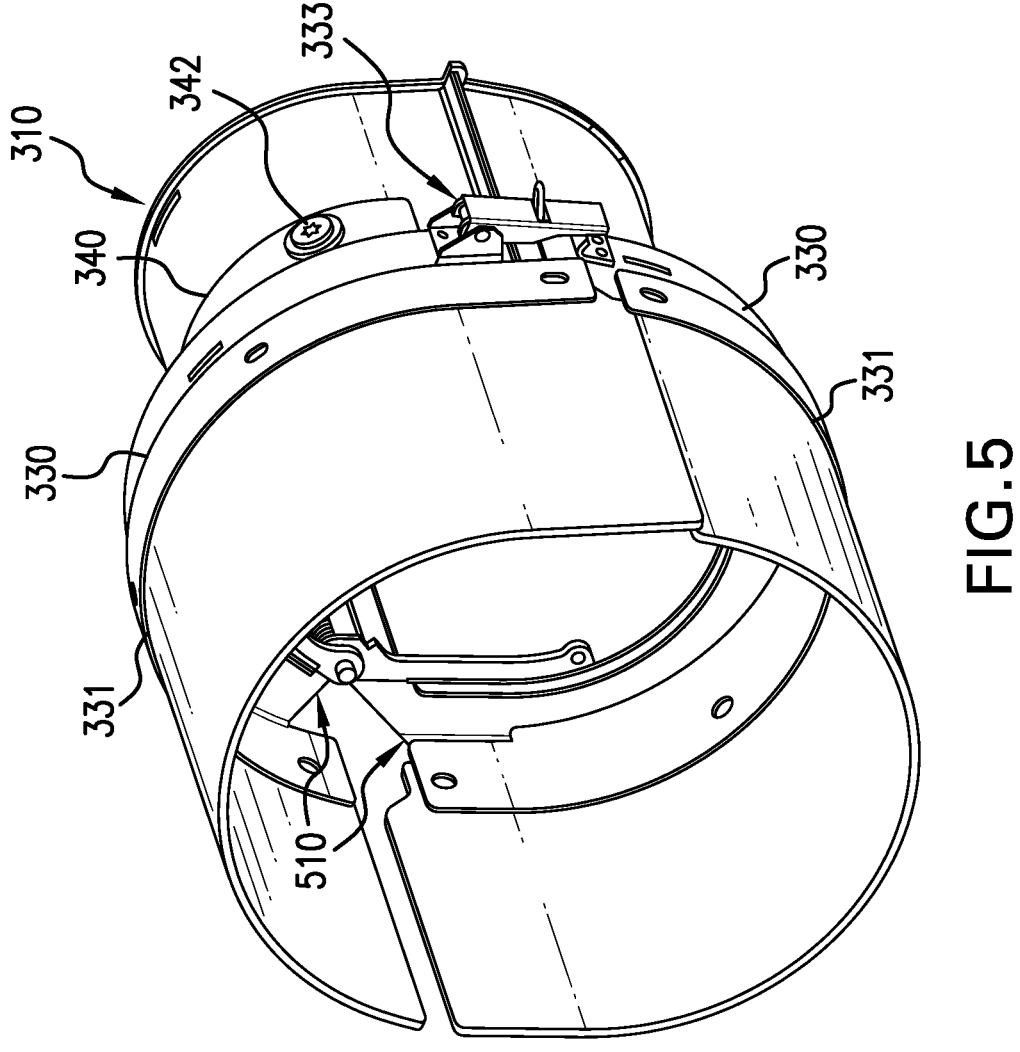
FIG. 5 illustrates a perspective view of the shield assembly of FIGS. 3-4 with a flexible section of the shield assembly removed.

To address some of the previously described issues with known work vehicles, and referring now to FIGS. 3-5 as well, the attachment (agricultural header) 110 provided according to the present disclosure includes a shield assembly 300 that is associated with and covers the power take-off 210 extending through the cowl 121 of the housing (feeder housing) 120. The shield assembly 300 includes a rigid section 310 and a flexible section 320 coupled to the rigid section 310. As can be appreciated from FIG. 4 especially, the rigid section 310 defines a first diameter D1 and the flexible section 320 defines a second diameter D2 that is greater than the first diameter D2. Exemplary values for the first diameter D1 include, but are not limited to, diameters in the range of 220-260 mm, such as 240 mm, and exemplary values for the second diameter D2 include, but are not limited to, diameters in the range of 315-355 mm, such as 335 mm. It should be appreciated that the values for the first diameter D1 and the second diameter D2 may be chosen for a variety of reasons, including but not limited to the available space in the area, the size of the power take-off 210, etc.

As can be appreciated from FIGS. 2-5, the power take-off 210 extends through the cowl 121 and the shield assembly 300 to drive one or more elements of the header 110. The header 110 is movable with respect to the feeder housing 120. Generally, the movement of the header 110 with respect to the feeder housing 120 is tilting, as is known. The flexible section 320 of the shield assembly 300 is configured to fit over and maintain overlap with the cowl 121 during tilting of the header 110. The overlap of the flexible section 320 with the cowl 121 is illustrated by the distance O in FIG. 3, which indicates where the cowl 121 is covered by the flexible section 320. Unlike known shield assemblies, which are generally formed entirely of rigid materials, the flexible section 320 of the shield assembly 300 can deform and flex in response to tilting of the header 110, which allows the flexible section 320 to remain fitted over and overlapped with the cowl 121 during tilt to cover the power take-off 210. The flexible section 320 may comprise a variety of materials, including but not limited to elastomers such as rubber, urethanes, etc. that are capable of elastically deforming without breaking during tilting of the header 110. In contrast, the rigid section 310 may be coupled to a portion of the header 110 where there is little, if any, relative movement so the rigid section 310 does not need to flex (or be flexible) in order to cover the power take-off 210. The shield assembly 300 including the flexible section 320 that fits over the cowl 121 allows the header 110 to tilt while still shielding the power take-off 210 during the tilting.

The flexible section 320 can be configured to maintain various amounts of overlap O with the cowl 121 during different tilting movements of the header 110 relative to the feeder housing 120. In some embodiments, the flexible section 320 is configured to maintain at least 30 mm of overlap O with the cowl 121 during 3° of tilting, such as lateral tilting, of the header 110. As used herein, "lateral" tilting generally refers to tilting of the header 110 that occurs in a width direction of the header 110, i.e., in a direction that extends into the page in FIG. 1. The flexible section 320 may alternatively or additionally be configured to maintain at least 30 mm of overlap O with the cowl 121 during at least 3° of fore-aft, i.e., front-to-back, tilting, such as 8 degrees of aft tilting and 9 degrees of fore tipping. Many different types of mechanisms for tilting the header 110 relative to the feeder housing 120 are known, so discussion of such mechanisms is omitted for brevity. In some embodiments, the flexible section 320 is configured to maintain at least 50 mm of overlap O with the cowl 121 when there is no tilting of the header 110. It should be appreciated that the flexible section 320 can be configured to maintain other amounts of overlap at different degrees of tilting, or during no tilting, but the previously described values represent exemplary values that may be typical for certain safety standards and/or during normal operation.

As previously described, the flexible section 320 defines the second diameter D2 that is greater than the first diameter D1 of the rigid section 310. The flexible section 320 having the larger second diameter D2 also helps maintain the overlap O with the cowl 121 during flexing. Referring specifically to FIGS. 4 and 5, it is illustrated that the shield assembly 300 includes one or more ribs 510 that are coupled to the flexible section 320 and space the flexible section 320 from the rigid section 310. The rib(s) 510 may, for example, extend radially away from the rigid section 310 to space the flexible section 320 from the rigid section 310. As illustrated, there may be multiple ribs 510 that space the flexible section 320 from the rigid section 310. The rib(s) 510 may couple to the flexible section 320 by coupling to a mount 330 that couples the rib(s) 510 to the flexible section 320. In some embodiments, the mount 330 is a polymer or metal piece that is formed integrally with the rib(s) 510 and the flexible section 320 is mounted to the mount 330 by one or more mounting plates 331 that clamp the flexible section 320 to the mount 330. The mounting plate(s) 331 may clamp the flexible section 320 to the mount 330 through compression that is provided by one or more bolts 332 coupling the mounting plate(s) 331 to the mount 330.

As illustrated in FIG. 5, the rigid section 310 and the flexible section 320 may each define a generally oval cross-section. As used herein, the cross-sections are "generally" oval in the sense that the cross-sections may not be fully oval due to, for example, gaps formed in the rigid section 310 and/or the flexible section 320, i.e., the rigid section 310 and/or the flexible section 320 may define, for example, an interrupted oval cross-section that is otherwise oval except for the gap(s). It should be appreciated that the flexible section 320 may have a generally oval shape in the resting/unflexed state but can define other cross-section shapes when deformed during tilting of the header 110. Similarly, the mount 330 and the mounting plate(s) 331 may define a generally oval shape that complements the shape of the flexible section 320.

Figure 6:
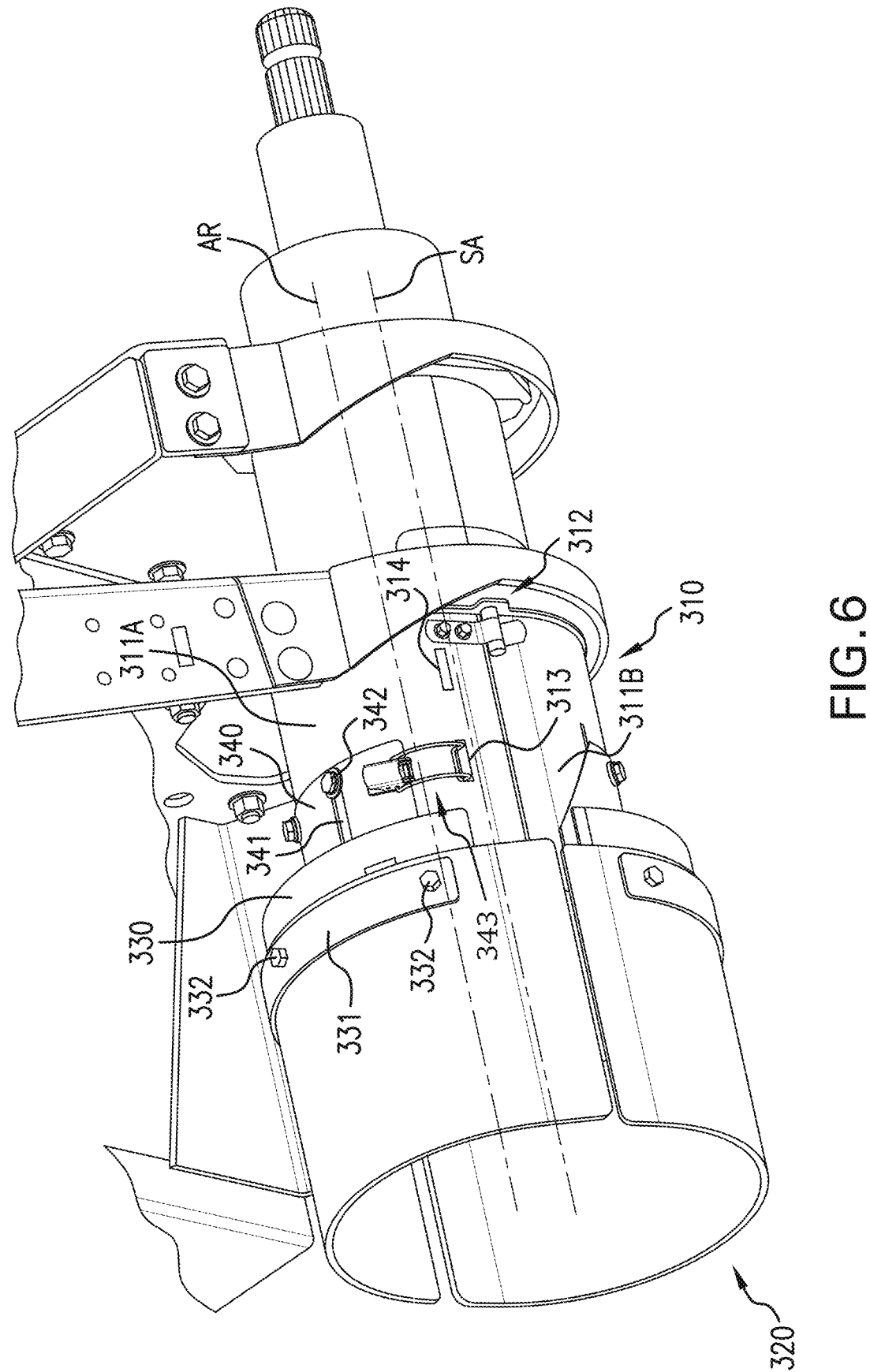
FIG. 6 illustrates a perspective view of the shield assembly of FIGS. 3-5 with a slider including a latch to open and close the shield assembly.
Figure 7:
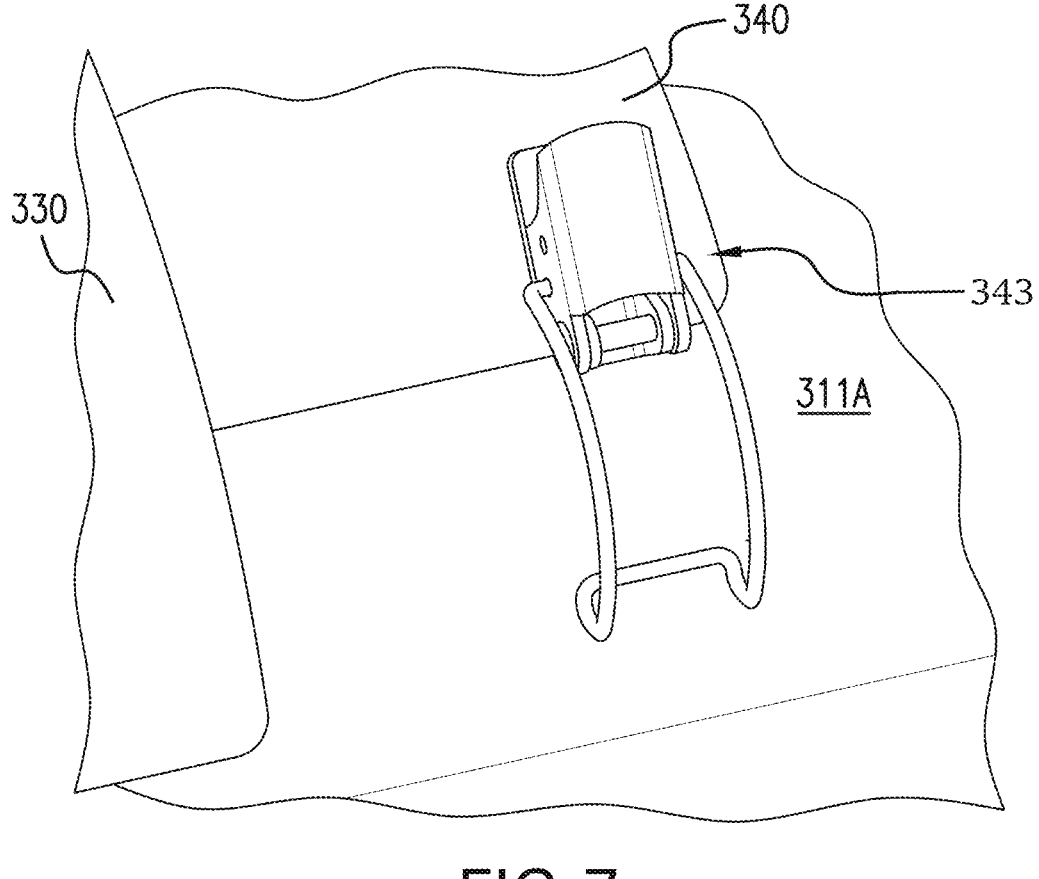
FIG. 7 illustrates a close-up perspective view of the latch of FIG. 6.

Referring still to FIGS. 2-5, and referring now to FIGS. 6-7 as well, it is illustrated that the shield assembly 300 may include a slider 340 that slideably couples the flexible section 320 to the rigid section 310. In some embodiments, the slider 340 includes one or more elongated slots 341 that have a slider bolt 342 disposed therein. The slider bolt 342 may be coupled to the rigid section 310 and help to keep the slider 340 and the flexible section 320 coupled to the rigid section 310. In some embodiments, the rib(s) 510 and the mount 330 couple the flexible section 320 to the slider 340, with the rib(s) 510 coupling the mount 330 to the slider 340. The slider 340 may have a shape that complements the rigid section 310 so the slider 340 is capable of smoothly sliding along the rigid section 310 without being too loose. When the flexible section 320 and the rigid section 310 are in the desired position with respect to one another, a latch 333 coupled to the mount 330 may be used to close the flexible section 320 and cover the power take-off 210.

Referring specifically to FIGS. 6-7, it is illustrated that, in some embodiments, the rigid section 310 includes a pair of rigid sections 311A, 311B forming the rigid section 310 and a section latch 312 that can be used to lock and unlock the rigid sections 311A, 311B to one another. The rigid section 310 may also include a first latch opening 313 and a second latch opening 314 that is spaced from the first latch opening 313. The slider 340 may include a latch 343 that is configured to latch to the first latch opening 313 when the slider 340 is at a first latch position, illustrated in FIG. 6, and latch to the second latch opening 314 when the slider 340 is at a second position. In the illustrated embodiment of FIG. 6, the slider 340 may be in the first position to "close" the shield assembly 300, i.e., cover the power take-off 210, and be in the second position to "open" the shield assembly 300, i.e., expose the power take-off 210. To move the slider 340 between the first position and the second position, a user may unlatch the latch 343 from the respective latch opening 313, 314 before sliding the slider 340 to the desired position and latching the latch 343 to the respective latch opening 313, 314. In some embodiments, the slider 340 is configured to slide between the first position and the second position along a slider axis SA that is parallel to an axis of rotation AR of the power take-off 210, as best seen in FIG. 6. The slider 340 thus provides an easy and convenient way for a user to both cover and uncover the power take-off 210 with the shield assembly 300 in a manner that does not require any special tools, such as a spanner.

Referring specifically to FIG. 4, it is illustrated that the shield assembly 300 may include a mounting section 350 at an end of the shield assembly 300 opposite the flexible section 320. The mounting section 350 may be flexible or rigid and coupled to the rigid section 310. The mounting section 350 may include an end surface 351 that covers a part of the opening through the rigid section 310. The end surface 351 has a take-off opening 352 formed therein that allows the power take-off 210 to extend therethrough. The end surface 351 may also include a plurality of mounting features 353, 354, illustrated as protrusions 353 and openings 354, that can couple to corresponding features of the header 110 to secure the shield assembly 300. It should be appreciated that the illustrated mounting section 350 is exemplary only and the shield assembly 300 may be mounted in the header 110 in any suitable fashion according to the present disclosure.

From the foregoing, it should be appreciated that the shield assembly 300 provided according to the present disclosure can fit over and maintain overlap O with the cowl 121 during tilting of the attachment (header) 110. Maintaining the overlap O with the cowl 121 allows the shield assembly 300 to continue shielding the power take-off 210 and reduce the risk of damage to the power take-off 210 and/or injury to a user. Further, the flexible section 320 can have a larger clearance, relative to the cowl 121, than known shield assemblies to allow additional tilting without affecting the function of the shield assembly 300. Even further, the shield assembly 300 can be easily adjustable by incorporating the slider 340 so a user can open and close the shield assembly 300 in a convenient manner that does not require any special tools.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:
1. A work vehicle, comprising:
a chassis;
a housing carried by the chassis and comprising a cowl;
a power take-off extending through the cowl and configured to connect to a power source; and
an attachment movably coupled to the housing and comprising:
   at least one driven element coupled to the power take-off; and
   a shield assembly associated with and covering the power take-off, the shield assembly comprising:
      a rigid section defining a first diameter;
      a flexible section coupled to the rigid section and defining a second diameter that is greater than the first diameter, the flexible section being configured to fit over and maintain overlap with the cowl during tilting of the attachment; and
      a slider rigidly coupled to the flexible section and slidably coupled to the rigid section to slidably couple the flexible section to the rigid section, wherein the slider is configured to slide between a first position and a second position along a slider axis;
      wherein the rigid section comprises a first latch opening and a second latch opening spaced from the first latch opening along the slider axis, and the slider comprises a latch configured to latch to the first latch opening when the slider is at the first position and to the second latch opening when the slider is at the second position.

2. The work vehicle of claim 1, wherein the flexible section is configured to maintain at least 30 mm of overlap with the cowl during 3° of tilting of the attachment.

3. The work vehicle of claim 2, wherein the flexible section is configured to maintain at least 50 mm of overlap with the cowl when there is no tilting of the attachment.

4. The work vehicle of claim 2, wherein the flexible section is configured to maintain at least 30 mm of overlap with the cowl during 3° of lateral tilting of the attachment.

5. The work vehicle of claim 1, wherein the flexible section comprises an elastomer.

6. The work vehicle of claim 1, wherein the shield assembly comprises at least one rib rigidly coupled to the flexible section and to the slider, wherein the at least one rib spaces the flexible section from the rigid section.

7. The work vehicle of claim 1, wherein the shield assembly comprises a plurality of ribs rigidly coupled to the flexible section and to the slider, wherein the plurality of ribs spaces spacing the flexible section from the rigid section.

8. The work vehicle of claim 6, wherein the shield assembly comprises at least one mount rigidly coupling the flexible section to the at least one rib.

9. The work vehicle of claim 6, wherein the at least one rib extends radially away from the rigid section.

10. The work vehicle of claim 1, wherein the slider axis is parallel to an axis of rotation of the power take-off.

11. The work vehicle of claim 1, wherein the power take-off comprises at least two universal joints coupled together.

12. The work vehicle of claim 1, wherein the rigid section defines a generally oval cross-section.

13. The work vehicle of claim 12, wherein the flexible section defines a generally oval cross-section.

14. The work vehicle of claim 1, wherein the attachment is an agricultural header, and the at least one driven element comprises a row unit.

15. The work vehicle of claim 14, wherein the housing is a feeder housing.

* * * * *